(12) United States Patent
Li

(10) Patent No.: US 7,714,266 B2
(45) Date of Patent: May 11, 2010

(54) METHOD AND APPARATUS FOR MEASURING SOURCE FOLLOWER GAIN IN AN IMAGE SENSOR ARRAY

(75) Inventor: Xiangli Li, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 233 days.

(21) Appl. No.: 11/652,680

(22) Filed: Jan. 12, 2007

(65) Prior Publication Data

US 2008/0169414 A1    Jul. 17, 2008

(51) Int. Cl.
- H01J 40/14 (2006.01)
- H03G 3/20 (2006.01)
- H03F 3/04 (2006.01)

(52) U.S. Cl. .................... 250/214 R; 250/214 AG; 330/250

(58) Field of Classification Search .......... 250/208.1, 250/214 R, 214 A, 214 LA, 214 LS, 214.1, 250/214 AG, 214 C, 576; 348/296, 307–309, 348/300, 301, 319, 320, 298; 330/250, 254, 330/4.5, 4.9; 257/48, 225, 290–298

See application file for complete search history.

(56) References Cited

U.S. PATENT DOCUMENTS

| | | | | |
|---|---|---|---|---|
| 4,477,780 A | * | 10/1984 | Spires | 330/265 |
| 6,797,933 B1 | * | 9/2004 | Mendis et al. | 250/208.1 |
| 6,903,670 B1 | | 6/2005 | Lee et al. | |
| 7,368,698 B2 | * | 5/2008 | Altice | 250/208.1 |
| 7,511,755 B2 | * | 3/2009 | Krymski | 348/308 |
| 2002/0011554 A1 | * | 1/2002 | Brehmer et al. | 250/208.1 |
| 2005/0035271 A1 | * | 2/2005 | Kochi et al. | 250/208.1 |
| 2006/0007329 A1 | | 1/2006 | Panicacci | |

FOREIGN PATENT DOCUMENTS

| | | |
|---|---|---|
| EP | 1 176 813 A2 | 1/2002 |
| GB | 2 401 274 A | 11/2004 |

* cited by examiner

*Primary Examiner*—Que T Le
*Assistant Examiner*—Don Williams
(74) *Attorney, Agent, or Firm*—Dickstein Shapiro LLP

(57) ABSTRACT

Disclosed embodiments provide a method and apparatus for measuring the gain of output transistors of pixels in an imager device. Source/drain terminals of the output transistor and a reset transistor are driven with various input voltages to generate pixel output voltages. The slope of a line representing the relationship between the output voltages and the input voltages is determined. A component of the slope corresponding to gain not caused by the output transistor is removed from the slope to determine the gain of the output transistor.

30 Claims, 10 Drawing Sheets

METHOD AND APPARATUS FOR MEASURING SOURCE FOLLOWER GAIN IN AN IMAGE SENSOR ARRAY

FIELD OF THE INVENTION

Embodiments of the invention relate generally to imagers and more particularly to methods and apparatuses for measuring the gain of source follower transistors used in an imager array.

BACKGROUND OF THE INVENTION

A CMOS imager circuit includes a focal plane array of pixel circuits, each one of the pixels including a photosensor, for example, a photogate, photoconductor or a photodiode overlying a substrate for accumulating photo-generated charge in the underlying portion of the substrate. Each pixel has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing photo charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

FIG. 1 illustrates a CMOS imager 100 having a pixel array 102 connected to column sample and hold (S/H) circuitry 136. The pixel array 102 comprises a plurality of pixels 220 arranged in a predetermined number of rows and columns.

A plurality of row and column lines are provided for the entire array 102. The row lines e.g., SEL(0) are selectively activated by row decoder 130 and driver circuitry 132 in response to an applied row address to apply pixel operating row signals. Column select lines (not shown) are selectively activated in response to an applied column address by column circuitry that includes column decoder 134. Thus, row and column addresses are provided for each pixel 220. The CMOS imager 100 is operated by a sensor control and image processing circuit 150, which controls the row and column circuitry for selecting the appropriate row and column lines for pixel readout and which could perform other processing functions. Additionally, voltage supply circuit 144 provides a pixel supply voltage, Vaa_pix, to the pixels in the array.

Pixels in each column of the pixel array are connected to sampling capacitors and switches in the S/H circuitry 136. A pixel reset signal Vrst and a pixel image signal Vsig for selected pixels are sampled and held by the S/H circuitry 136. A differential signal (Vrst-Vsig) is produced for each readout pixel by the differential amplifier 138 (AMP), which may also apply a gain to the signal received from the S/H circuitry 136.

The differential signal is digitized by an analog-to-digital converter 140. The analog-to-digital converter 140 supplies the digitized pixel signals to the sensor control and image processing circuit 150, which among other things, forms a digital image output.

FIG. 2 illustrates a portion 210 of CMOS imager 100. The illustrated portion 210 includes a pixel 220 connected to a column sample and hold circuit 240 by a pixel output column line 232. The portion 210 also shows the differential amplifier 138 and analog-to-digital converter 140.

The illustrated pixel 220 includes a photosensor 222 (e.g., a pinned photodiode, photogate, etc.), transfer transistor 224, floating diffusion region FD, reset transistor 226, source follower transistor 228 and row select transistor 230. The photosensor 222 is connected to the floating diffusion region FD by the transfer transistor 224 when the transfer transistor 224 is activated by a transfer control signal TX. The reset transistor 226 is connected between the floating diffusion region FD and the array pixel supply voltage Vaa_pix. A reset control signal RST is used to activate the reset transistor 226, which resets the floating diffusion region FD (as is known in the art).

The source follower transistor 228 has its gate connected to the floating diffusion region FD and is connected between the array pixel supply voltage Vaa_pix and the row select transistor 230. The source follower transistor 228 converts the stored charge at the floating diffusion region FD into an electrical output voltage signal. The row select transistor 230 is controllable by a row select signal SEL for selectively connecting the source follower transistor 228 and its output voltage signal to the pixel output line 232.

The column sample and hold circuit 240 includes a bias transistor 256, controlled by a control voltage Vln_bias, that is used to bias the pixel output line 232. The pixel output line 232 is also connected to a first capacitor 244 thru a sample and hold reset signal switch 242. The sample and hold reset signal switch 242 is controlled by the sample and hold reset control signal SHR. The pixel output line 232 is also connected to a second capacitor 254 thru a sample and hold pixel signal switch 252. The sample and hold pixel signal switch 252 is controlled by the sample and hold pixel control signal SHS. The switches 242, 252 are typically MOSFET transistors.

A second terminal of the first capacitor 244 is connected to the amplifier 138 via a first column select switch 250, which is controlled by a column select signal COLUMN_SELECT. The second terminal of the first capacitor 244 is also connected to a clamping voltage Vcl via a first clamping switch 246. Similarly, the second terminal of the second capacitor 254 is connected to the amplifier 138 by a second column select switch 260, which is controlled by the column select signal COLUMN_SELECT. The second terminal of the second capacitor 254 is also connected to the clamping voltage Vcl by a second clamping switch 248.

The clamping switches 246, 248 are controlled by a clamping control signal CLAMP. As is known in the art, the clamping voltage Vcl is used to place a charge on the two capacitors 244, 254 when it is desired to store the reset and pixel signals, respectively (when the appropriate sample and hold control signals SHR, SHS are also generated).

Referring to FIGS. 2 and 3, in operation, the row select signal SEL is driven high, which activates the row select transistor 230. When activated, the row select transistor 230 connects the source follower transistor 228 to the pixel output line 232. The clamping control signal CLAMP is then driven high to activate the clamping switches 246, 248, allowing the clamping voltage Vcl to be applied to the second terminal of the sample and hold capacitors 244, 254. The reset signal RST is then pulsed to activate the reset transistor 226, which resets the floating diffusion region FD. The signal from the source follower 228 (based on the reset floating diffusion region FD) is then sampled when the sample and hold reset control signal SHR is pulsed. At this point, the first capacitor 244 stores the pixel reset signal Vrst.

Afterwards, the transfer transistor control signal TX is pulsed, causing charge from the photosensor 222 to be transferred to the floating diffusion region FD. The signal from the source follower 228 (based on the charge transferred to the floating diffusion region FD) is sampled when the sample and hold pixel control signal SHS is pulsed. At this point, the second capacitor 254 stores a pixel image signal Vsig. A differential signal (Vrst-Vsig) is produced by the differential amplifier 138. The differential signal is digitized by the analog-to-digital converter 140. The analog-to-digital converter 140 supplies the digitized pixel signals to the processor 150.

When designing imagers and products incorporating them, it is desirable to know the gain of the source follower transistors 228 in the pixels 220. For example, designers use this gain value when calculating the conversion gain and the floating diffusion responsivity of the pixels 220 in an array 102 and when comparing outputs of imagers made using different processes. Currently, there is no direct way to measure the gain of the source follower transistors 228 accurately. Instead, designers use an approximate value of the source follower gain, such as 0.8. There exists a need and desire for a technique for directly measuring the gain of the source follower transistors 228 used in imager pixels 220.

DETAILED DESCRIPTION

Figure 4:
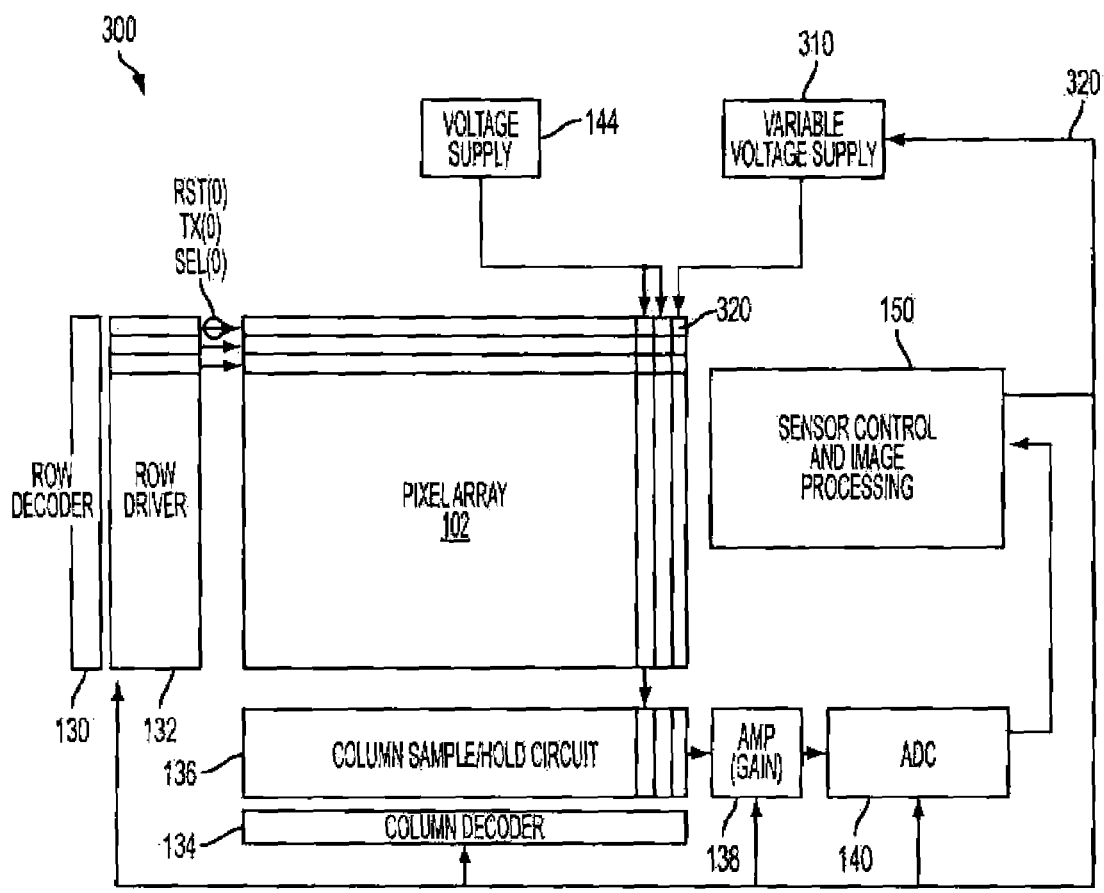
FIG. 4 illustrates an imager according to an example embodiment of the invention.

FIG. 4 illustrates an embodiment of an imager 300 configured to directly measure the gain of the source follower transistors contained within pixel 320 of a pixel array. Imager 300 is similar to imager 100, but in addition to having voltage supply 144 for providing the array pixel supply voltage Vaa_pix to the pixels of array 102, the imager 300 includes a variable voltage supply 310. Variable voltage supply 310 provides Vaa_pix to a subset of pixels in the array 102. For example, in the embodiment of FIG. 4, variable voltage supply 310 provides Vaa_pix to pixels 320 in one column of the array 102, while the pixels 220 in the remaining columns receive Vaa_pix from a fixed voltage supply 144.

While voltage supply 144 typically provides a fixed Vaa_pix voltage, variable voltage supply 310 can provide a Vaa_pix voltage having various voltages. For example, the voltage supply 144 might provide a Vaa_pix voltage fixed at 2.8 volts, the variable voltage supply 310 might be able to sweep its Vaa_pix voltage from 2.2 volts to 2.8 volts during operation of the imager 300. The voltage output from variable voltage supply 310 depends upon an input signal 320. Input signal 320 for controlling the voltage output from variable voltage supply 310 could be generated by the processing circuitry 150 or by another component.

Figure 1:
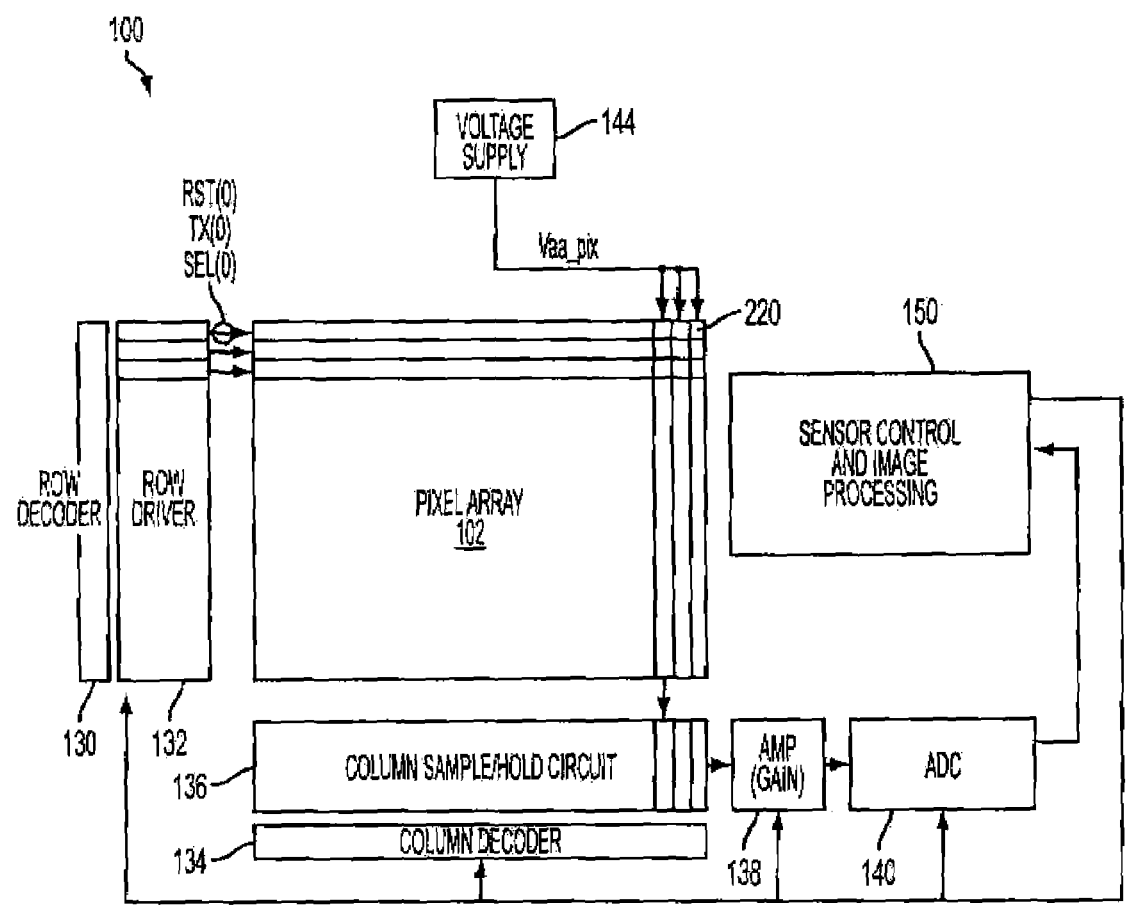
FIG. 1 illustrates a CMOS imager.
Figure 2:
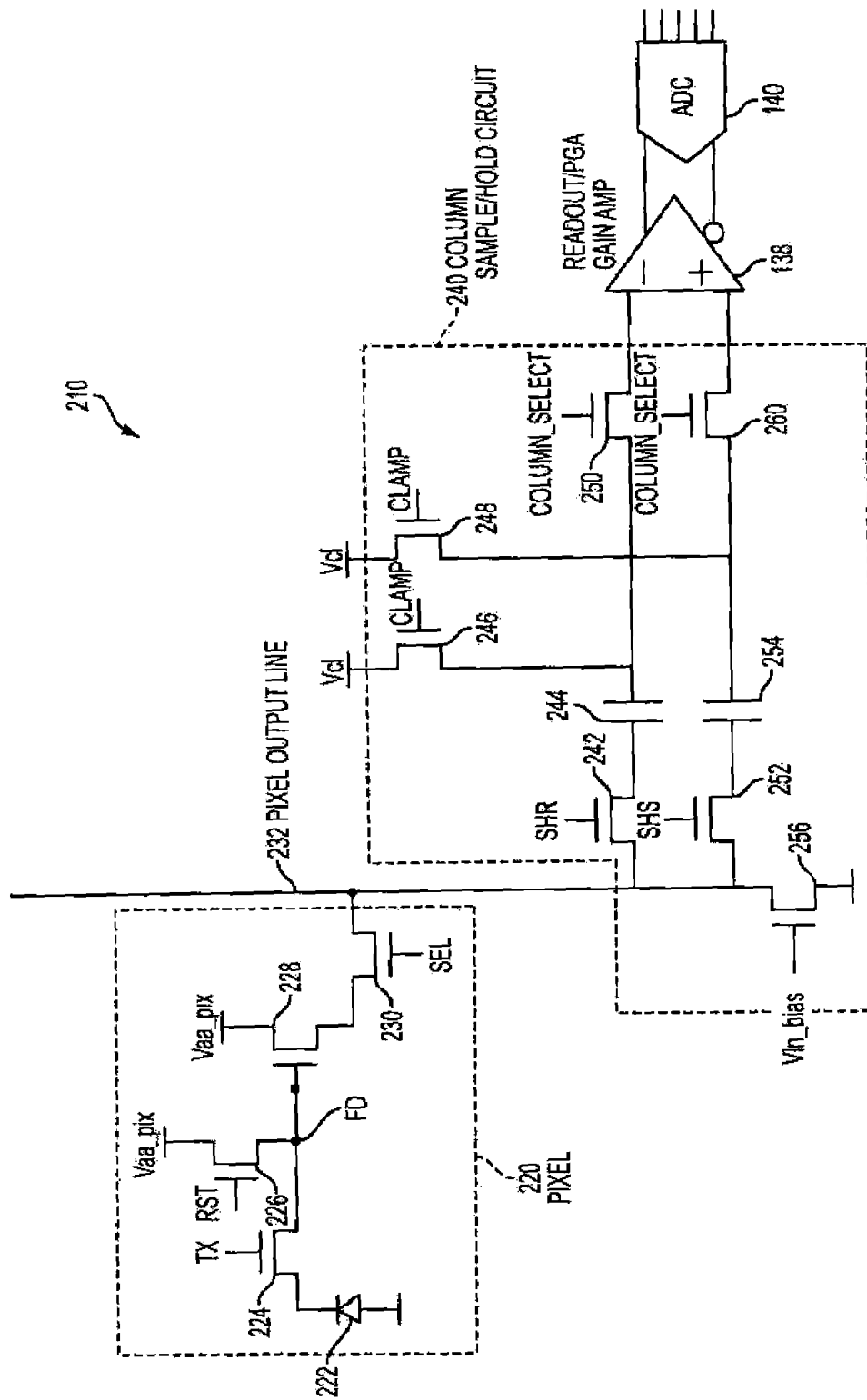
FIG. 2 is a diagram of a portion of a CMOS imager.
Figure 3:
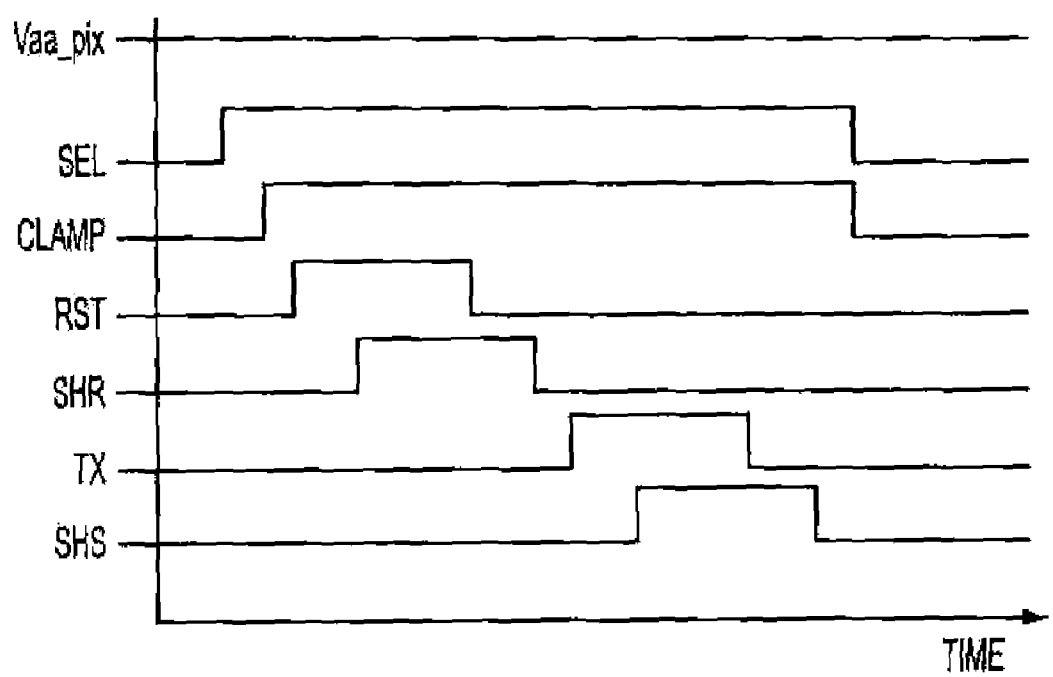
FIG. 3 is a timing diagram of the operation of the FIG. 2 imager.
Figure 5:
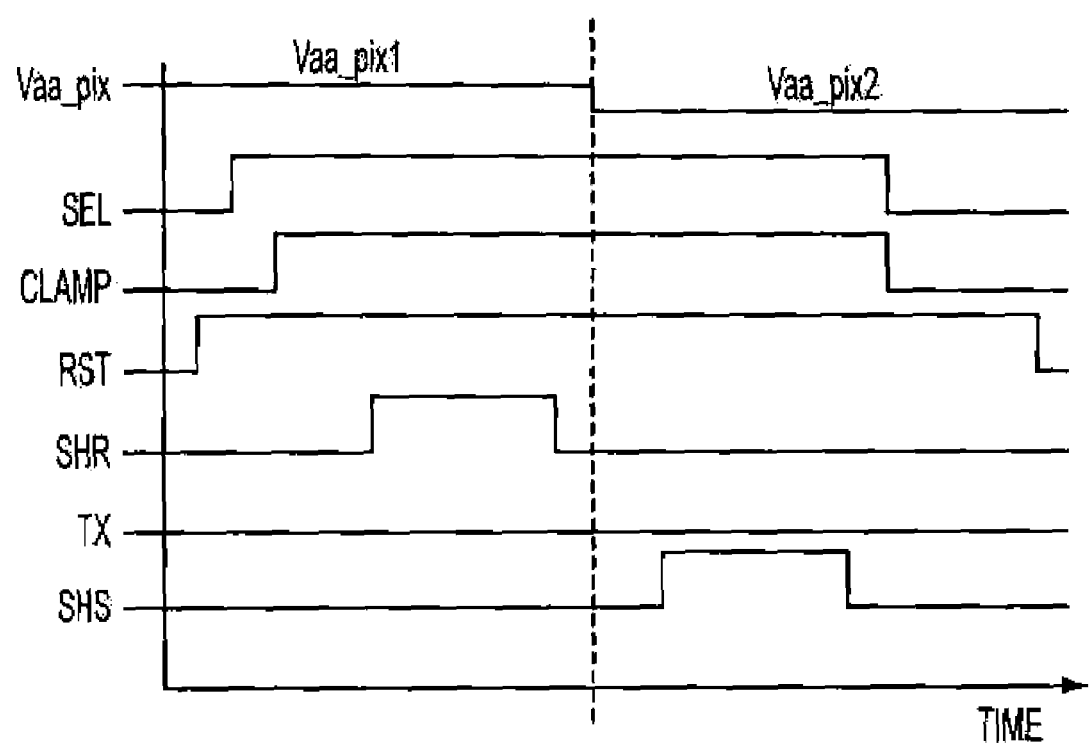
FIG. 5 is a timing diagram of an operation of the FIG. 4 imager according to an embodiment of the invention.

To measure source follower gain, imager 300 is operated in a manner different than the operation shown in FIG. 3. FIG. 5 is a readout timing diagram showing a readout timing pattern used when measuring source follower gain. As explained below in the description of FIG. 9, embodiments of the invention can repeat this readout timing pattern for each pixel in each row of one or more columns of the array. There are three primary differences between this pattern and the standard readout timing pattern shown in FIG. 3. First, during a source follower gain measurement, the transfer control signal TX is held low and reset control signal RST is held at a voltage higher than or equal to the combination of Vaa_pix and the threshold voltage of reset transistor 226. Maintaining TX and RST at these levels causes the voltage at the gate of source follower transistor 228 (FIG. 2) to correspond with the Vaa_pix voltage input to the pixel by variable voltage supply 310.

As shown in the top line of FIG. 5, during the source follower gain measurement, the Vaa_pix voltage is not fixed. Instead, between the reset sample pulse SHR and the sample and hold pulse SHS, the Vaa_pix voltage changes from Vaa_pix1 to Vaa_pix2. Thus, during the reset sample pulse SHR, the column sample and hold circuit 240 samples a signal generated by source follower 228 when the gate of the source follower 228 is driven to Vaa_pix1 volts (via the FD region). During the sample and hold pulse SHS, the column sample and hold circuit 240 samples a signal generated by source follower 228 when the voltage at its gate is Vaa_pix2 volts (via the FD region). Therefore, the signal output by differential amplifier 138 and digitized by analog-to-digital converter 140 will represent the difference between the signals output by the source follower 228 when driven first by Vaa_pix1 and then by Vaa_pix2.

Figure 6:
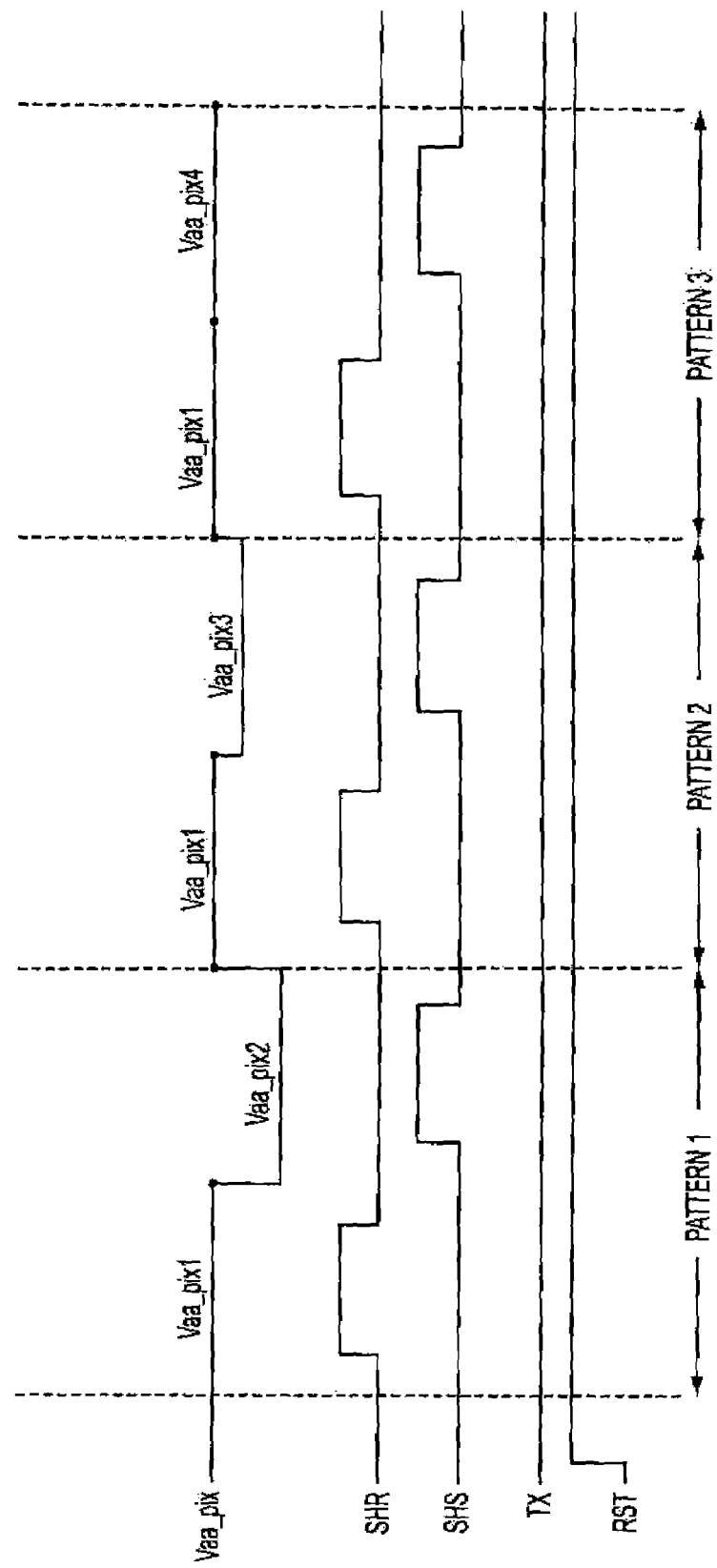
FIG. 6 is a timing diagram of an operation of the FIG. 4 imager according to an embodiment of the invention.

FIG. 6 is a timing diagram showing three readout timing patterns of an embodiment of a method for measuring source follower gain. In this embodiment, Vaa_pix is fixed at Vaa_pix1 during the reset sample pulse SHR. However, during the sample and hold pulse SHS, variable voltage supply 310 sweeps Vaa_pix between three voltages: Vaa_pix2, Vaa_pix3, and Vaa_pix4. Note that during pattern 3, the Vaa_pix voltage during the reset sample pulse SHR (Vaa_pix1) has the same voltage level as Vaa_pix voltage (Vaa_pix4) during the sample and hold pulse SHS. As these Vaa_pix voltages correspond, the signals generated by the source follower should also correspond, and the output of differential amplifier 138 should be 0 volts.

Figure 7:
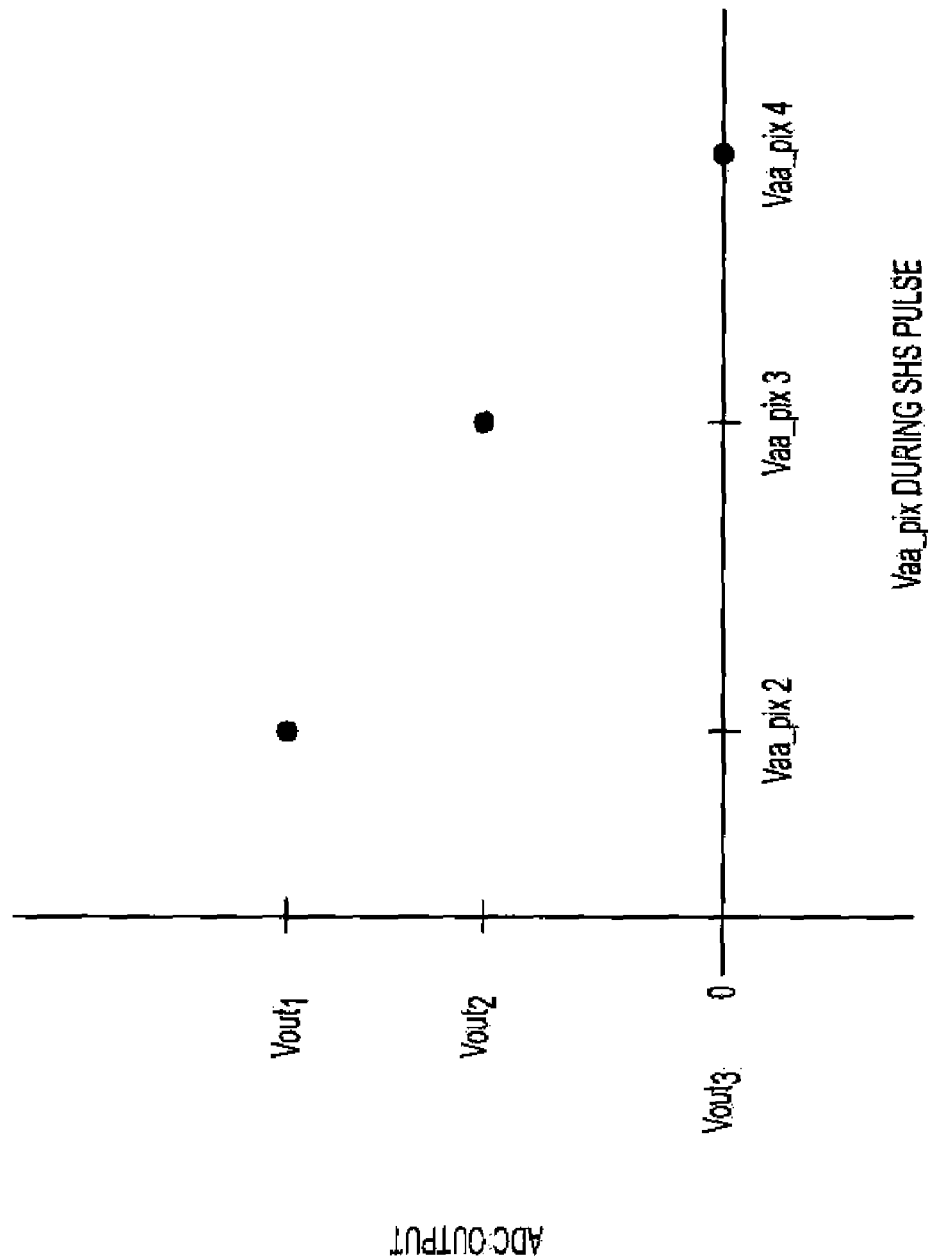
FIG. 7 is a graph showing values related to an operation of the FIG. 4 imager.

FIG. 7 is a graph associating the values output by analog-to-digital converter 140 at the end of each pattern with the Vaa_pix voltage applied during the sample and hold pulse SHS of the pattern. In this graph, $V_{out1}$ is the value output by analog-to-digital converter 140 at the end of pattern 1, $V_{out2}$ is the voltage output by analog-to-digital converter 140 at the end of pattern 2, and $V_{out3}$ is the value output by analog-to-digital converter 140 at the end of pattern 3. Note that $V_{out3}$ should correspond to 0 volts because the gate of the source follower 228 receives two equal Vaa_pix voltages during the pattern (see pattern 3 of FIG. 6).

From the values shown in FIG. 7, one can calculate the gain of the circuit that includes the source follower transistor 228

Figure 8:
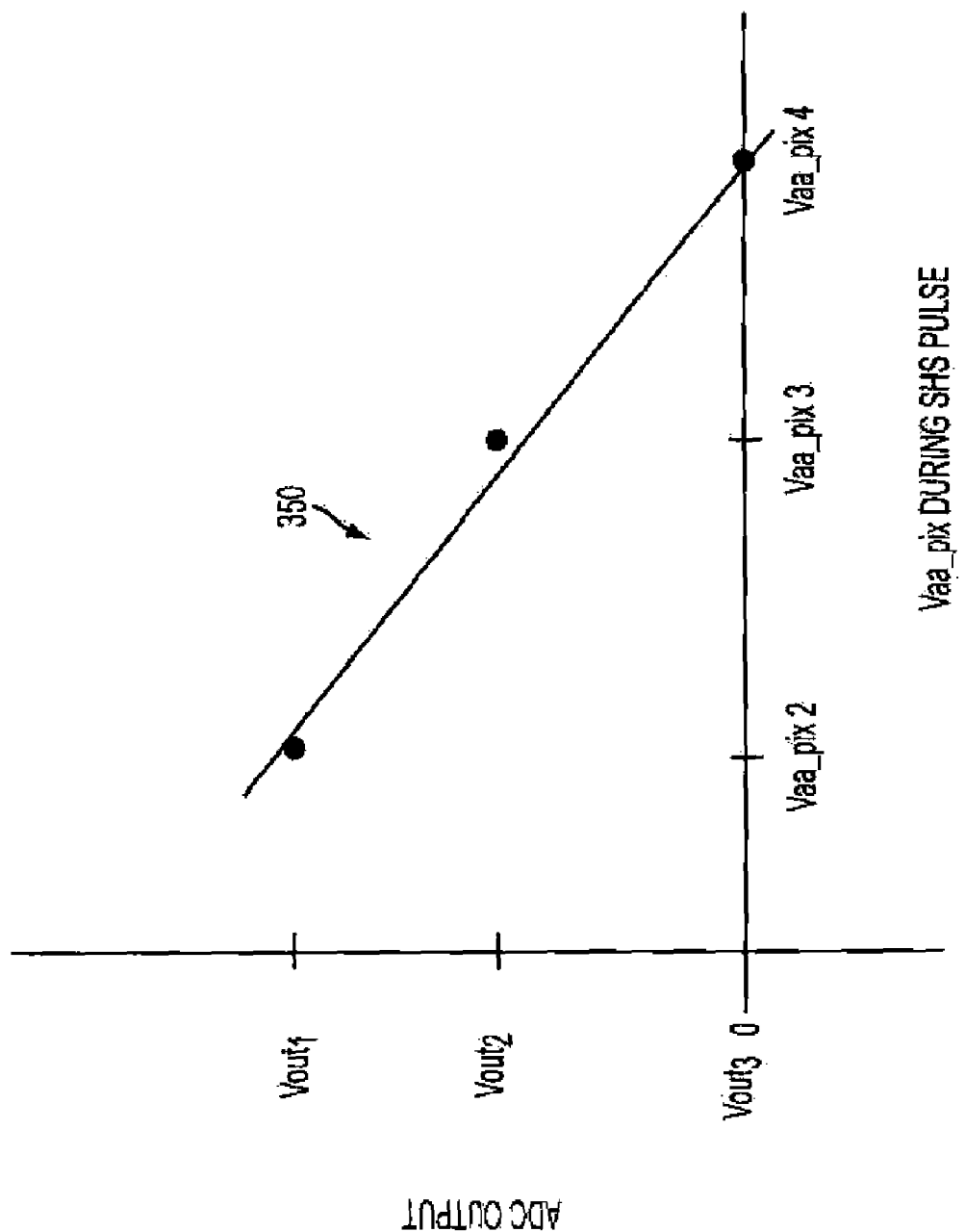
FIG. 8 is a graph showing values related to an operation of the FIG. 4 imager.

("Gain$_T$"). As shown in FIG. 8, gain Gain$_T$ corresponds to the slope of a line 350 fitted to the points on the graph. Methods of fitting lines to data points are well known and include, e.g., least squares regression.

Gain$_T$ corresponds to the gain of the source follower transistor 228 ("Gain$_{SF}$") multiplied by a gain caused by other components in the same circuit as source follower transistor 228. The gain caused by the other components is known as the analog signal chain gain ("Gain$_{ASC}$"), and methods of directly measuring the analog signal chain gain are well known. The following equation represents the relationship between Gain$_T$, Gain$_{SF}$, and Gain$_{ASC}$.

$$Gain_T = Gain_{SF} \times Gain_{ASC}$$

Based on this equation, the gain of the source follower 228 can be determined by dividing the gain calculated from the slope of line 350 by the analog signal chain gain, as illustrated by the following equation.

$$Gain_{SF} = \frac{Gain_T}{Gain_{ASC}}$$

Figure 9:
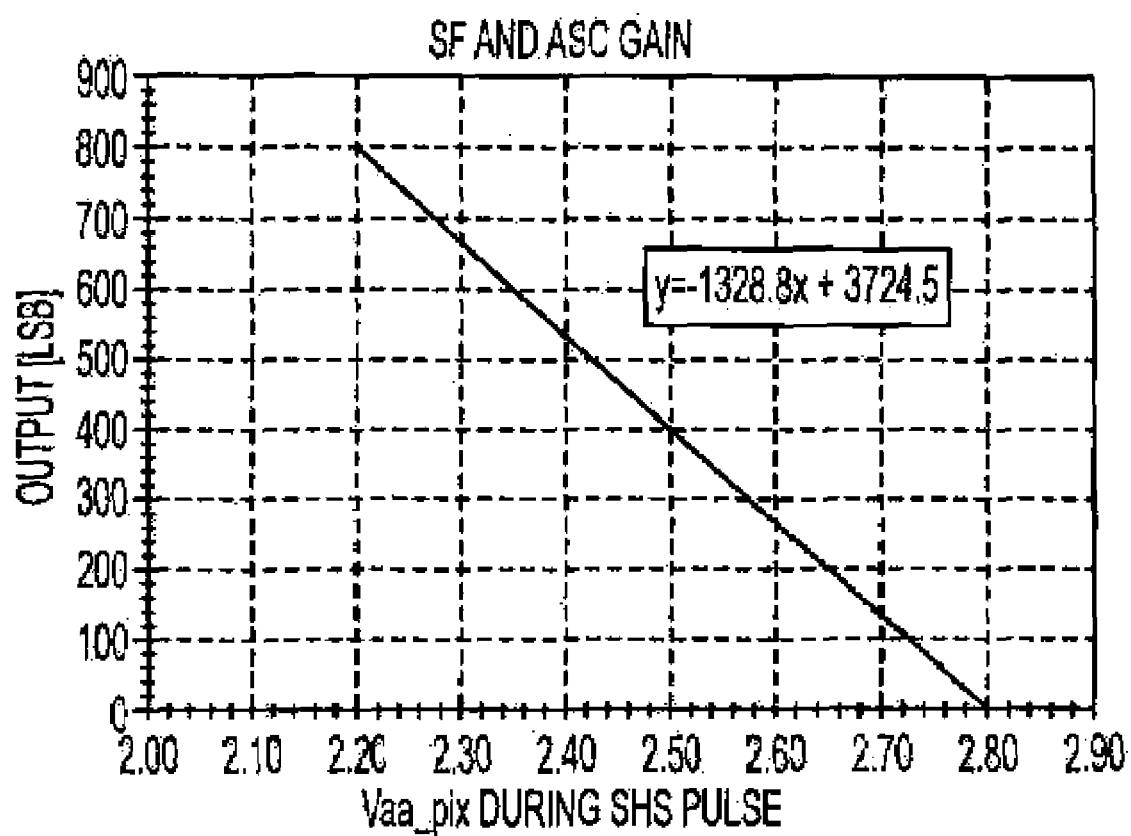
FIG. 9 is a graph showing values related to an operation of the FIG. 4 imager.

FIG. 9 shows another graph associating values output by analog-to-digital converter 140 with Vaa_pix voltages applied during the sample and hold pulse SHS of readout timing patterns. This graph resulted from performing an embodiment of the measurement described above using a test imager. During the test, the Vaa_pix voltage during the reset sample pulse SHR was kept at 2.8 volts while the Vaa_pix voltage during the sample and hold pulse SHS was swept from 2.2 volts to 2.8 volts.

To increase accuracy, the measurement was performed using a column of pixels. Thus, to determine one point on the graph, the Vaa_pix voltages applied during the reset sample pulse SHR and during the sample and hold pulse SHS were set. The X-axis of the graph of FIG. 9 represents the Vaa_pix voltage applied during the sample and hold pulse SHS. Next, each pixel in the column was operated according to the readout timing diagram of FIG. 5. In response, analog-to-digital converter 140 output a series of digital voltage values for the column, each voltage associated with one pixel in the column. These digital voltage values were averaged together, and the Y-axis represents this averaged value in units of least significant bit ("LSB"), where 1LSB is the voltage change represented by a change in the least significant bit of analog-to-digital converter 140.

As the graph of FIG. 9 shows, when the Vaa_pix voltage during the sample and hold pulse SHS was 2.20V, the average of the values output by analog-to-digital converter 140 was 800LSB. When the Vaa_pix voltage during the sample and hold pulse SHS was 2.8, the average of the values output by analog-to-digital converter 140 was 0LSB. When the Vaa_pix voltage during the sample and hold pulse SHS was varied between these values, for each Vaa_pix voltage increment the average of the analog-to-digital converter 140 output values could be approximated by the curve of FIG. 9 using a well known curve fitting technique. The slope of this curve is −1328.8LSB/V. This slope is the product of the average gain of the source follower transistors in the pixels tested and the analog signal chain gain for the test imager. Using well known methods, the analog signal chain gain of the test imager was measured as 1545V/LSB. Thus, the source follower transistor gain was determined to be 1328.8 LSB/V divided by 1545 V/LSB, or 0.86.

Figure 10:
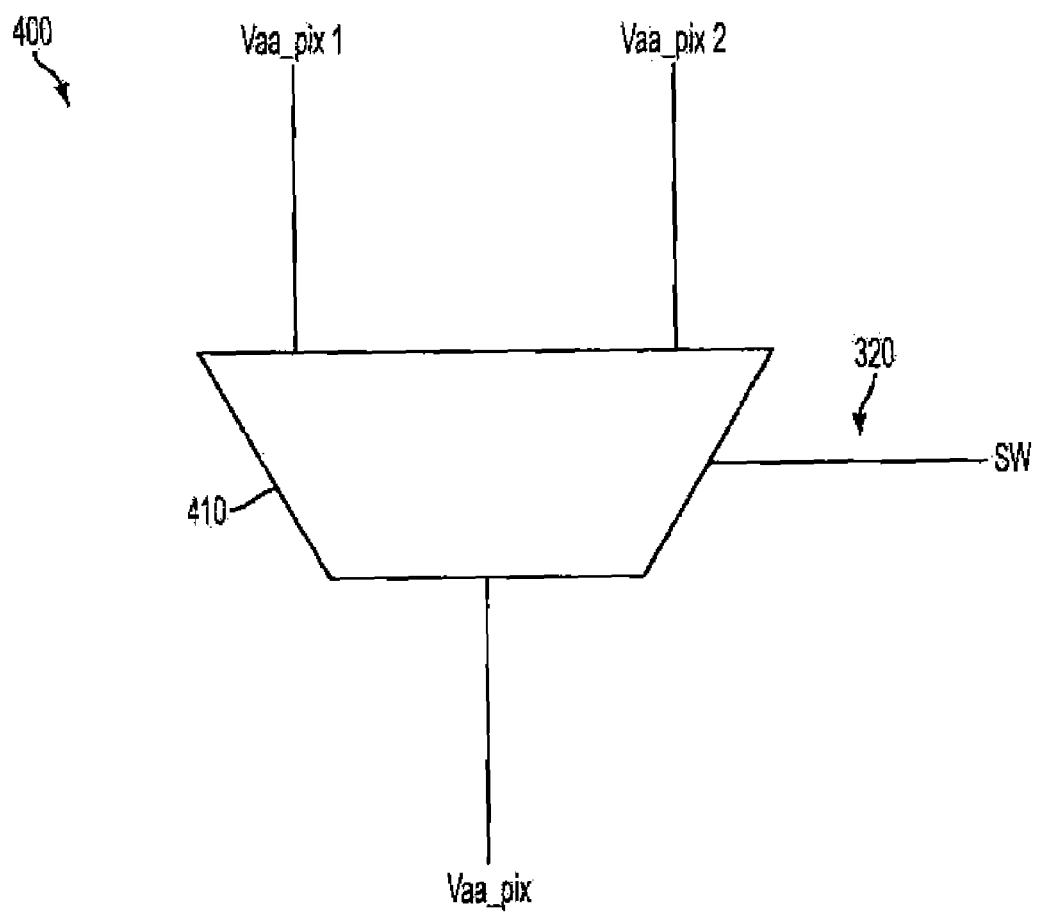
FIG. 10 illustrates an embodiment of a variable voltage supply used in the FIG. 4 imager.

FIG. 10 shows an embodiment 400 of variable voltage supply 310. The embodiment 400 includes a multiplexer 410 that is controlled by switching signal SW 320 and that receives input voltages Vaa_pix1 and Vaa_pix2. The output of the multiplexer 410 provides the Vaa_pix voltage to one or more pixels 302 in array 102. Of course, if additional Vaa_pix voltage levels are needed, they can be provided as additional inputs to multiplexer 410.

When using the embodiment shown in FIG. 10, if both Vaa_pix1 and Vaa_pix2 are fixed voltages, then the variable voltage supply 310 can apply only two different voltages to pixels during the sample and hold pulse SHS. Patterns 2 and 3 of FIG. 6 illustrate this operation. Pattern 2 would result in analog-to-digital converter 140 outputting a non-zero value, while Pattern 3 would result in analog-to-digital converter 140 outputting a zero value. This embodiment produces two data points for a graph like the one shown in FIG. 7, and source follower gain can be determined using the above described methods. In this case, the source follower gain is the slope of a line passing through the two data points divided by the analog signal chain gain.

When using the embodiment shown in FIG. 10, Vaa_pix1 could be provided by the fixed voltage source powering the remaining pixels in the array (i.e., it can be connected to supply 144 of FIG. 4). Such an embodiment simplifies operating the pixels used to measure source follower gain in the same manner as the remaining pixels in the array.

As explained above, these techniques for measuring source follower gain do not require connecting all pixels in the array to the variable voltage supply 310. Instead, one could connect to the variable voltage supply 310 any combination of pixels in the array, including pixels located in one or more columns and including light shielded optically black pixels. For example, source follower gain could be measured using one or more columns of light shielded optically black pixels.

The various calculations required by the methods described above can be done with any processing capability that receives the output of analog-to-digital converter 140. Such processing capabilities could include processing circuitry located in imager 300, e.g. 150, or external to imager 300 in, for example, test equipment. The capability could also be implemented using any combination of hardware or software.

The above description and drawings illustrate embodiments that achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. An apparatus comprising:
    a pixel circuit comprising an output transistor;
    a switchable voltage supply for applying a plurality of voltages to the output transistor;
    a sampling circuit for sampling at least two output voltages of the pixel circuit when the voltage supply applies at least two voltages to the output transistor; and
    a circuit for determining the gain of the output transistor from the sampled output voltages.

2. The apparatus of claim 1, wherein the circuit is configured for determining the gain of the output transistor by determining a relationship between the sampled output voltages and at least one of the voltages applied to the output transistor.

3. The apparatus of claim 1, wherein the circuit is configured for determining the gain of the output transistor by determining the slope of a curve approximating the relationship between at least one of the applied voltages and the sampled output voltages.

4. The apparatus of claim 3, wherein the circuit is configured for determining the gain by removing from the slope a component corresponding to gain caused by a component other than the output transistor.

5. The apparatus of claim 1, wherein the sampling circuit is configured for outputting a difference signal representing a difference between the at least two output voltages.

6. The apparatus of claim 5, wherein the circuit is configured for determining the gain from the difference signal.

7. The apparatus of claim 6, wherein the circuit is configured for determining the gain based on a relationship between the difference signal and at least one of the plurality of voltages applied to the output transistor.

8. The apparatus of claim 6, wherein the circuit is configured for determining the gain based on the slope of a curve representing a relationship between the difference signal and at least one of the plurality of voltages applied to the output transistor.

9. The apparatus of claim 1, wherein:
the pixel circuit further comprises a reset transistor electrically connected to a charge storage region for resetting the storage region; and
the switchable voltage supply is configured for applying the plurality of voltages to the reset transistor.

10. The apparatus of claim 9, wherein the switchable voltage supply is configured for applying at least one of the plurality of voltages to the output and reset transistors at a first time.

11. An imager comprising:
at least one pixel comprising:
a charge storage region;
an output transistor for providing a pixel output signal, said output transistor having a gate connected to said charge storage region; and
a reset transistor electrically connected to the charge storage region for resetting the storage region;
a first circuit for providing a first input voltage to a terminal of the output and reset transistors at a first time and a second input voltage to a terminal of the output and reset transistors at a second time; and
a second circuit for measuring the level of the pixel output signal at said first and second times.

12. The imager of claim 11, further comprising:
an array of said pixels,
wherein:
said first circuit is configured for providing said first and second input voltages to all pixels in at least one column of said array, and
said second circuit is configured for measuring the level of the output signal of a plurality of pixels in said at least one column of said array.

13. The imager of claim 12, wherein said at least one column comprises a plurality of columns of said array.

14. The imager of claim 11, wherein:
said at least one pixel further comprises:
a photo sensor; and
a transfer transistor for coupling said photo sensor to said charge storage region; and
said imager further comprises:
a third circuit for holding the transfer transistor off during a period where the first and second input voltages are applied.

15. The imager of claim 11, further comprising a circuit for providing a voltage to the gate of the reset transistor that is equal to or greater than the combination of the threshold voltage of the reset transistor and the larger of the first and second input voltages.

16. The imager of claim 11, wherein the first circuit comprises a switch receiving the first voltage, the second voltage, and a switch control input, the switch control input controlling which of the first and second voltages is provided at an output of the switch.

17. The imager of claim 11, further comprising a determining circuit for determining the gain of the output transistor from the measured levels of the pixel output signal at said first and second times.

18. The imager of claim 17, wherein the determining circuit is configured for determining the gain of the output transistor based on a relationship between one of the first and second input voltages and the measured levels of the pixel output signal at said first and second times.

19. The imager of claim 17, further comprising a signal processor comprising at least the determining circuit.

20. A method of operating a system comprising:
applying a plurality of voltages to an output transistor of a pixel circuit;
sampling at least two output voltages from the pixel circuit while applying at least two of the voltages to the output transistor; and
determining the gain of the output transistor from the sampled output voltages.

21. The method of claim 20, further comprising determining the gain of the output transistor by determining a relationship between the sampled output voltages and at least one of the voltages applied to the output transistor.

22. The method of claim 20, further comprising determining the gain of the output transistor by determining the slope of a curve approximating the relationship between at least one of the applied voltages and the sampled output voltages.

23. The method of claim 22, further comprising determining the gain by removing from the slope a component corresponding to gain caused by a component other than the output transistor.

24. A method of operating an imager comprising:
providing a first input voltage at a first time to a terminal of an output transistor for providing an output signal from a pixel, said output transistor having a gate connected to a charge storage region;
providing the first input voltage at the first time to a terminal of a reset transistor electrically connected to the charge storage region for resetting the storage region;
providing a second input voltage to the terminals of the output and reset transistors at a second time; and
measuring the level of the pixel output signal at said first and second times.

25. The method of claim 24, further comprising determining the gain of the output transistor from the measured levels of the pixel output signal at said first and second times.

26. The method of claim 24, further comprising determining the gain of the output transistor based on a relationship between one of the first and second input voltages and the measured levels of the pixel output signal at said first and second times.

27. A method of forming an apparatus for measuring source follower gain, the method comprising:
forming a pixel circuit comprising a source follower transistor;
forming a switchable voltage supply configured to apply a plurality of voltages to the source follower transistor;

forming a sampling circuit for sampling at least two output voltages of the pixel circuit when the voltage supply applies at least two voltages to the source follower transistor; and forming a determining circuit configured to determine the gain of the source follower transistor from the sampled output voltages.

28. The method of claim 27, wherein the determining circuit is further configured to determine the gain of the source follower transistor by determining a relationship between the sampled output voltages and at least one of the voltages applied to the source follower transistor.

29. The method of claim 27, wherein the sampling circuit is further configured to output a difference signal representing a difference between the at least two output voltages.

30. The method of claim 27, wherein:

forming the pixel circuit further comprises forming a reset transistor electrically connected to a charge storage region for resetting the storage region; and the switchable voltage supply is further configured to apply the plurality of voltages to the reset transistor.

* * * * *